US012602827B2

(12) United States Patent
Sharma et al.

(10) Patent No.: US 12,602,827 B2
(45) Date of Patent: Apr. 14, 2026

(54) CAMERA MONITORING SYSTEM FOR VEHICLES INCLUDING AUTOMATICALLY CALIBRATING CAMERA

(71) Applicant: Stoneridge Electronics AB, Solna (SE)

(72) Inventors: Utkarsh Sharma, Farmington Hills, MI (US); Liang Ma, Rochester, MI (US); Nguyen Phan, Allen Park, MI (US); Troy Otis Cooprider, White Lake, MI (US); Banuprakash Murthy, Novi, MI (US)

(73) Assignee: STONERIDGE ELECTRONICS AB, Solna (SE)

( * ) Notice: Subject to any disclaimer, the term of this patent is extended or adjusted under 35 U.S.C. 154(b) by 206 days.

(21) Appl. No.: 18/079,987

(22) Filed: Dec. 13, 2022

(65) Prior Publication Data

US 2023/0206497 A1 Jun. 29, 2023

Related U.S. Application Data

(60) Provisional application No. 63/293,191, filed on Dec. 23, 2021.

(51) Int. Cl.
G06T 7/80 (2017.01)
B60Q 9/00 (2006.01)
(Continued)

(52) U.S. Cl.
CPC ................. G06T 7/80 (2017.01); B60Q 9/00 (2013.01); B60R 1/26 (2022.01); B60R 1/28 (2022.01);
(Continued)

(58) Field of Classification Search
CPC ... G06T 7/80; G06T 7/73; G06T 2207/30244; G06T 2207/30252; B60R 1/28;
(Continued)

(56) References Cited

U.S. PATENT DOCUMENTS 8,643,724 B2 * 2/2014 Schofield .................. B60R 1/23
348/148
9,834,216 B2 * 12/2017 Pawlicki ................. B60R 11/04
(Continued)

FOREIGN PATENT DOCUMENTS

CN 113596389 A * 11/2021 ........... H04N 17/002
JP 2008225784 A * 9/2008
WO 2021043393 A1 3/2021

OTHER PUBLICATIONS

Wang, Jian, Xinyu Guo, and Xinyu Yang. "Efficient and Safe Strategies for Intersection Management: A Review." Sensors (Basel, Switzerland) 21.9 (2021): 3096. Web. (Year: 2021).*

(Continued)

*Primary Examiner* — Erin D Bishop
*Assistant Examiner* — Keith A von Volkenburg
(74) *Attorney, Agent, or Firm* — Carlson, Gaskey & Olds, P.C.

(57) ABSTRACT

A camera monitoring system includes a first mirror replacement camera extending outward from a vehicle. The first mirror replacement camera defines a rearward facing field of view including at least one image feature during at least a first set of operating conditions. The at least one image feature has a fixed position within the field of view during the at least the first set of operating conditions. A camera monitoring system controller is configured to automatically calibrate an orientation of the first mirror replacement camera relative to the vehicle by comparing an expected position of the at least one image feature to an actual position of the at least one image feature while the vehicle is operating under the first set of operating conditions and identifying a shift of camera orientation based on the difference.

20 Claims, 5 Drawing Sheets

(51) Int. Cl.

| | |
|---|---|
| _B60R 1/26_ | (2022.01) |
| _B60R 1/28_ | (2022.01) |
| _G06T 7/73_ | (2017.01) |
| _H04N 17/00_ | (2006.01) |

(52) U.S. Cl.
CPC ............. _G06T 7/73_ (2017.01); _H04N 17/002_ (2013.01); _B60R 2300/105_ (2013.01); _B60R 2300/20_ (2013.01); _B60R 2300/8046_ (2013.01); _G06T 2207/30244_ (2013.01); _G06T 2207/30252_ (2013.01)

(58) Field of Classification Search
CPC . B60R 1/26; B60R 2300/105; B60R 2300/20; B60R 2300/8046; B60Q 9/00; H04N 17/002
USPC ........................................................ 701/33.1
See application file for complete search history.

(56) References Cited

U.S. PATENT DOCUMENTS

| | | | | | |
|---|---|---|---|---|---|
| 2008/0117288 | A1* | 5/2008 | Park | ........................... | B60R 1/28 348/36 |
| 2016/0086033 | A1* | 3/2016 | Molin | ....................... | B60R 1/31 345/419 |
| 2016/0142596 | A1* | 5/2016 | DePaschoal | ........... | H04N 23/63 348/38 |
| 2017/0363885 | A1* | 12/2017 | Blum | ...................... | G03B 13/10 |
| 2018/0090039 | A1* | 3/2018 | Singireddy | ............. | G09F 21/04 |
| 2019/0152392 | A1* | 5/2019 | DePaschoal | ......... | H04N 13/344 |
| 2020/0294401 | A1* | 9/2020 | Kerecsen | ............... | G08G 1/205 |
| 2021/0035328 | A1* | 2/2021 | Syed | ......................... | B60R 1/25 |
| 2021/0158561 | A1* | 5/2021 | Park | ......................... | G06T 7/74 |
| 2021/0178984 | A1 | 6/2021 | Goth et al. | | |
| 2021/0206459 | A1* | 7/2021 | Johnson | ................. | G01C 23/00 |
| 2021/0248392 | A1* | 8/2021 | Zaheer | ................. | G06V 10/764 |
| 2021/0343044 | A1* | 11/2021 | Lee | ........................... | G06T 7/80 |
| 2021/0380143 | A1* | 12/2021 | Alvarez | ................ | B60W 50/14 |
| 2022/0051434 | A1* | 2/2022 | Suzuki | .................. | H04N 23/90 |
| 2022/0284627 | A1* | 9/2022 | Johnson | ............. | H04N 17/002 |
| 2022/0358677 | A1* | 11/2022 | Critchley | ................. | G06T 7/70 |
| 2023/0419542 | A1* | 12/2023 | Klinger | .................... | B60R 1/28 |

OTHER PUBLICATIONS

International Search Report and Written Opinion for International Application No. PCT/US2022/052626 mailed Mar. 29, 2023.
International Preliminary Report on Patentability for International Application No. PCT/US2022/052626 mailed Jul. 4, 2024.

\* cited by examiner 16a,16b

102

106

12

20a,20b

104

310'

310

308'

308

306'

311

12

306

304'

304

302'

302

307

400

410 ~ DETERMINE VEHICLE MEETS OPERATING CONDITION SET

420 ~ IDENTIFY IMAGE FEATURES IN IMAGE

430 ~ IDENTIFY EXPECTED POSITIONING OF IMAGE FEATURES

440 ~ DETERMINE DEVIATION BETWEEN ACTUAL AND EXPECTED POSITION

450 ~ DETERMINE PHYSICAL CAMERA SHIFT

462 ~ ADJUST IMAGE          ALERT OPERATOR ~ 466

464 ~ ADJUST CAMERA

CAMERA MONITORING SYSTEM FOR VEHICLES INCLUDING AUTOMATICALLY CALIBRATING CAMERA

CROSS-REFERENCE TO RELATED APPLICATION

This application claims priority to U.S. Provisional Patent Application No. 63/293191 filed on Dec. 23, 2021.

TECHNICAL FIELD

This disclosure relates to a camera monitoring system (CMS) for use in a vehicle, and more specifically a camera monitoring system including an automatically calibrating camera.

BACKGROUND

Mirror replacement systems, and camera systems for supplementing mirror views, are utilized in commercial vehicles to enhance the ability of a vehicle operator to see a surrounding environment. Camera monitoring systems (CMS) utilize one or more cameras to provide an enhanced field of view to a vehicle operator. In some examples, the mirror replacement systems cover a larger field of view than a conventional mirror, or include views that are not fully obtainable via a conventional mirror.

Camera monitoring systems typically include one or more cameras positioned within a wing arm that protrudes outward from a cab in or near the location that a conventional rear view mirror would be positioned. Alternative structures for housing the camera can be utilized, however current camera monitoring systems are required to extend the mirror away from the side of the cab in order to provide the full rear facing field of view. As with any mechanical structure, over time the structures supporting the cameras can weaken, loosen, or otherwise shift in ways that can cause the camera angle (the orientation of the field of view) relative to the cab to change. This in turn can cause the field of view provided by the camera to change and the images captured by the camera are difference given the same object location relative to the cab. Similarly, the camera height relative to the cab and/or the camera angle with respect to the cab can shift or alter over time.

SUMMARY OF THE INVENTION

In one exemplary embodiment a camera monitoring system includes a first mirror replacement camera extending outward from a vehicle, the first mirror replacement camera defining a rearward facing field of view, wherein the rearward facing field of view includes at least one image feature during at least a first set of operating conditions, and wherein the at least one image feature has a fixed position within the field of view during the at least the first set of operating conditions, and a camera monitoring system controller configured to automatically calibrate an orientation of the first mirror replacement camera relative to the vehicle by comparing an expected position of the at least one image feature to an actual position of the at least one image feature while the vehicle is operating under the first set of operating conditions and identifying a shift of camera orientation based on the difference.

In another example of the above described camera monitoring system the first mirror replacement camera is disposed on a commercial vehicle cab, and the at least one image feature includes at least one feature of a trailer connected to the cab.

In another example of any of the above described camera monitoring systems the at least one image features includes at least one element from a set including at least a trailer wheel, a trailer end corner, a trailer rear edge, and a trailer top edge.

In another example of any of the above described camera monitoring systems the at least one image feature includes at least two elements from the set.

In another example of any of the above described camera monitoring systems the first set of operating conditions includes a speed of the vehicle being above a first threshold and a steering angle of the vehicle being below a second threshold.

In another example of any of the above described camera monitoring systems the first set of operating conditions includes a road grade below a third threshold.

In another example of any of the above described camera monitoring systems the at least a first set of operating conditions includes a second set of operating conditions.

In another example of any of the above described camera monitoring systems the camera monitoring system controller is further configured to respond to the shift of camera orientation by adjusting a positioning of a class II view within a class IV view when the shift is below a predefined magnitude.

In another example of any of the above described camera monitoring systems a support structure for the mirror replacement camera includes at least one powered articulating element, the powered articulating element being controlled by the camera monitoring system controller, and wherein the camera monitoring system controller is configured to respond to the shift of camera orientation by articulating the powered articulating element such that the shift of camera orientation is reduced relative to a factory calibrated camera orientation.

In another example of any of the above described camera monitoring systems the camera monitoring system controller is configured to output at an alert to a vehicle operator when the shift or camera orientation exceeds a threshold magnitude.

An exemplary method for automatically calibrating an orientation of a vehicle mirror includes a camera monitoring system (CMS) controller receiving at least one image from a vehicle mounted camera, and comparing an expected position of at least one image feature to an actual position of the at least one image feature while the vehicle is operating under at least a first set of operating conditions and identifying a shift of camera orientation based on the difference.

In another example of the above described method for automatically calibrating an orientation of a vehicle mirror the vehicle mounted camera is disposed on a vehicle cab, and the at least one image feature includes at least one feature of a trailer connected to the vehicle cab.

In another example of any of the above described methods for automatically calibrating an orientation of a vehicle mirror the at least one image feature includes at least one element from a set including at least a trailer wheel, a trailer end corner, a trailer rear edge, and a trailer top edge.

In another example of any of the above described methods for automatically calibrating an orientation of a vehicle mirror the at least one image feature includes at least two elements from the set.

In another example of any of the above described methods for automatically calibrating an orientation of a vehicle mirror the first set of operating conditions includes a speed of the vehicle being above a first threshold and a steering angle of the vehicle being below a second threshold.

In another example of any of the above described methods for automatically calibrating an orientation of a vehicle mirror the first set of operating conditions includes a road grade below a third threshold.

In another example of any of the above described methods for automatically calibrating an orientation of a vehicle mirror the at least the first set of operating conditions includes a second set of operating conditions.

Another example of any of the above described methods for automatically calibrating an orientation of a vehicle mirror further includes responding to the shift of camera orientation by adjusting a positioning of a class II view within a class IV view when the shift is below a predefined magnitude.

Another example of any of the above described methods for automatically calibrating an orientation of a vehicle mirror further includes responding to the shift of camera orientation by articulating a powered articulating element such that the shift of camera orientation is reduced relative to a factory calibrated camera orientation.

Another example of any of the above described methods for automatically calibrating an orientation of a vehicle mirror further includes outputting an alert to a vehicle operator when the shift or camera orientation exceeds a threshold magnitude.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1A:
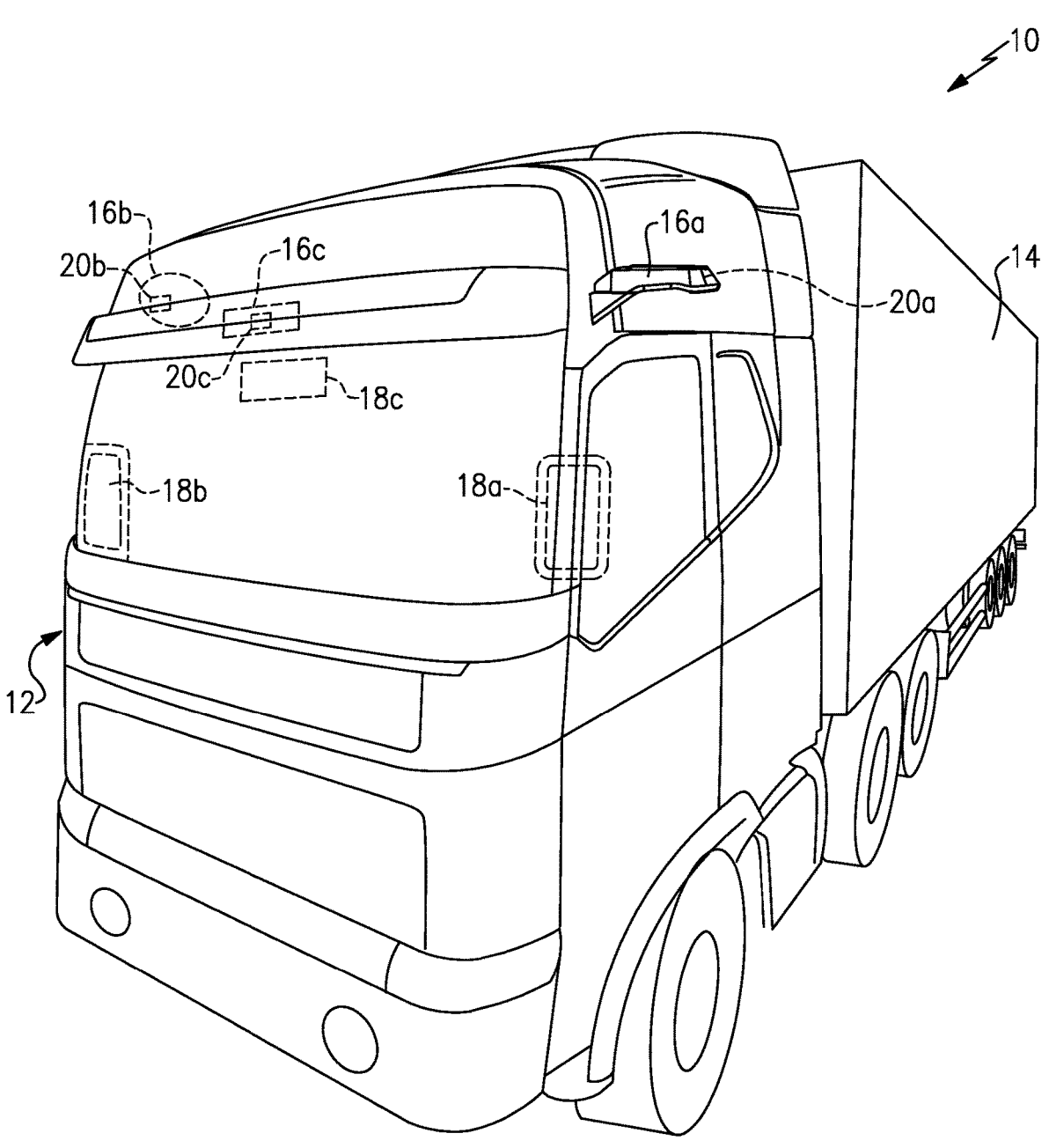
FIG. 1A is a schematic front view of a commercial truck with a camera monitoring system (CMS) used to provide at least Class II and Class IV views.
Figure 1B:
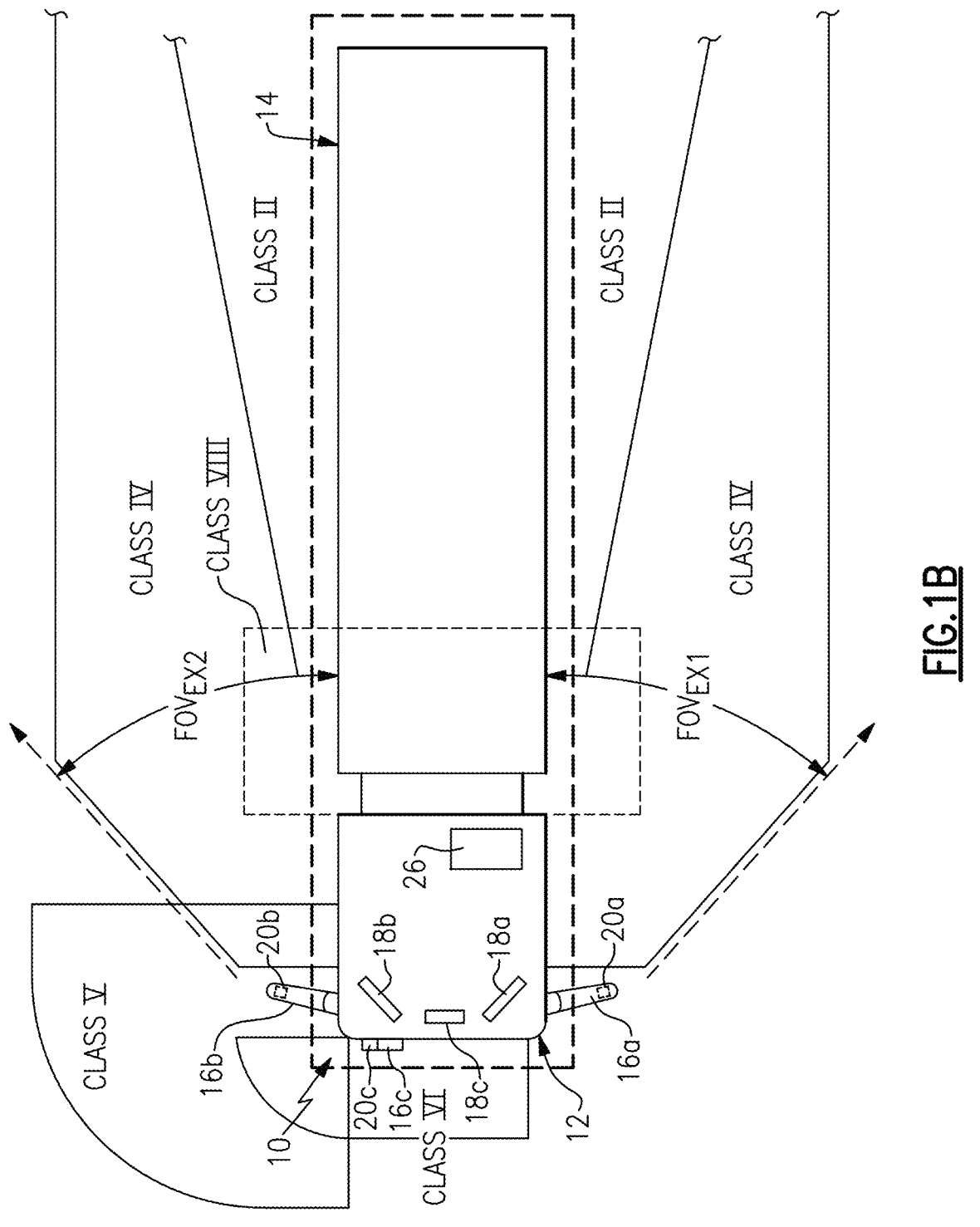
FIG. 1B is a schematic top elevational view of a commercial truck with a camera monitoring system providing Class II, Class IV, Class V, Class VI, and Class VIII views.
Figure 2:
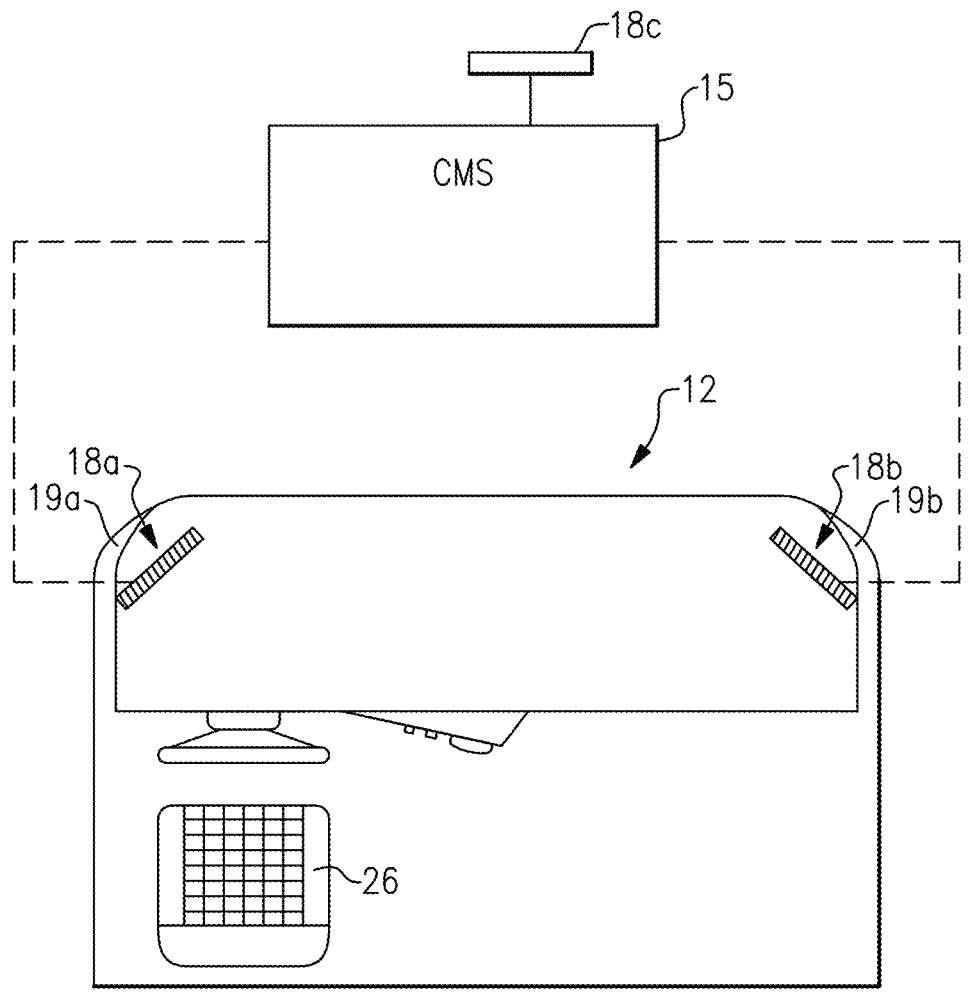
FIG. 2 is a schematic top perspective view of a vehicle cabin including displays.

A schematic view of a commercial vehicle 10 is illustrated in FIGS. 1A and 1B, and a schematic view of an example vehicle cabin 22 is shown in FIG. 2. The vehicle 10 includes a vehicle cab or tractor 12 for pulling a trailer 14. Although a commercial truck is contemplated in this disclosure, the invention may also be applied to other types of vehicles. The vehicle 10 incorporates a camera monitoring system (CMS) 15 (FIG. 2) that has driver and passenger side camera arms 16a, 16b mounted to the outside of the vehicle cab 12. If desired, the camera arms 16a, 16b may include conventional mirrors integrated with them as well, although the CMS 15 can be used to entirely replace mirrors. In additional examples, each side can include multiple camera arms, each arm housing one or more cameras and/or mirrors.

Figures 3, 4:
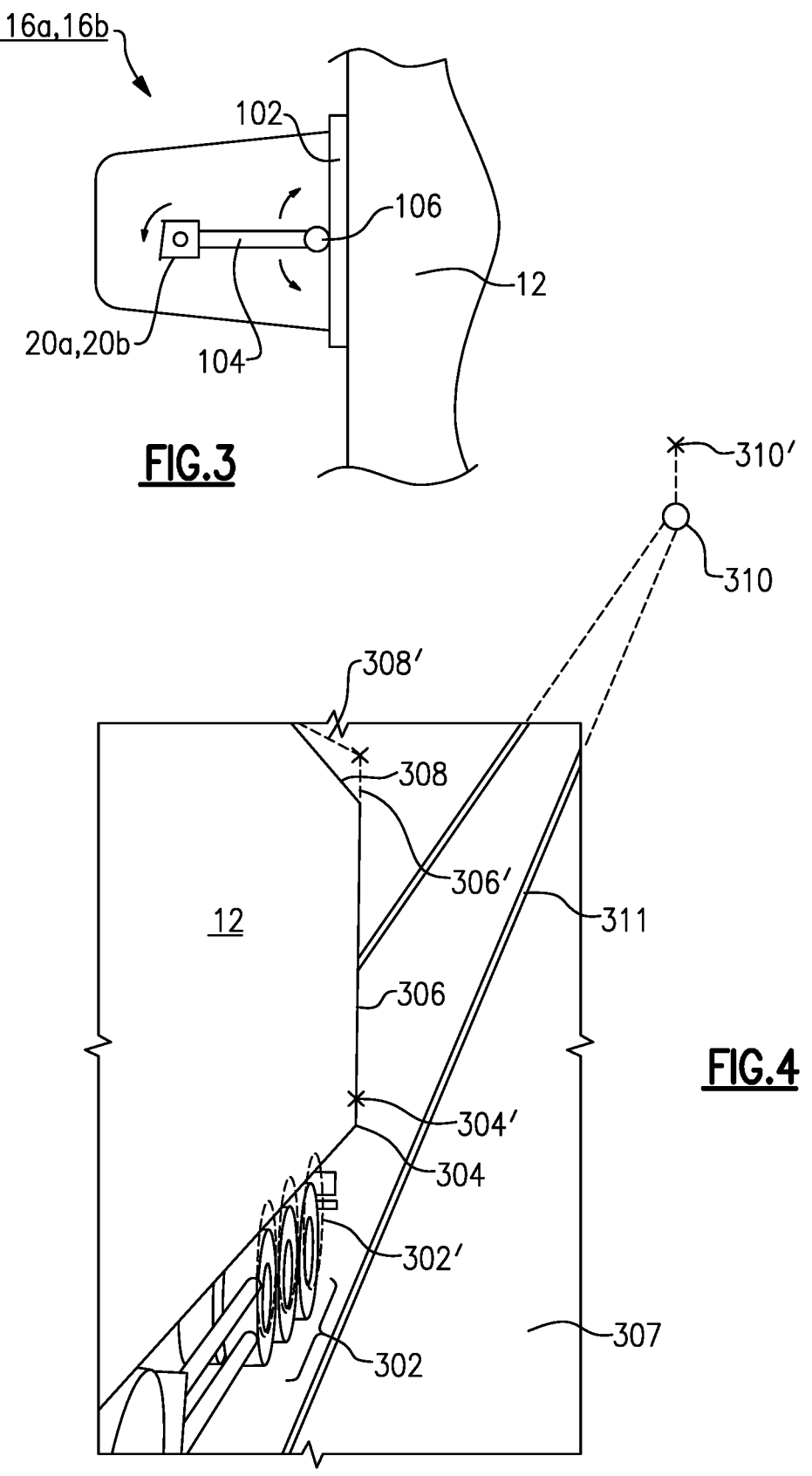
FIG. 3 schematically illustrates an exemplary wing arm structure supporting a camera portion of a CMS.
FIG. 4 schematically illustrates an exemplary view provided by the CMS of FIG. 3.
Figure 5:
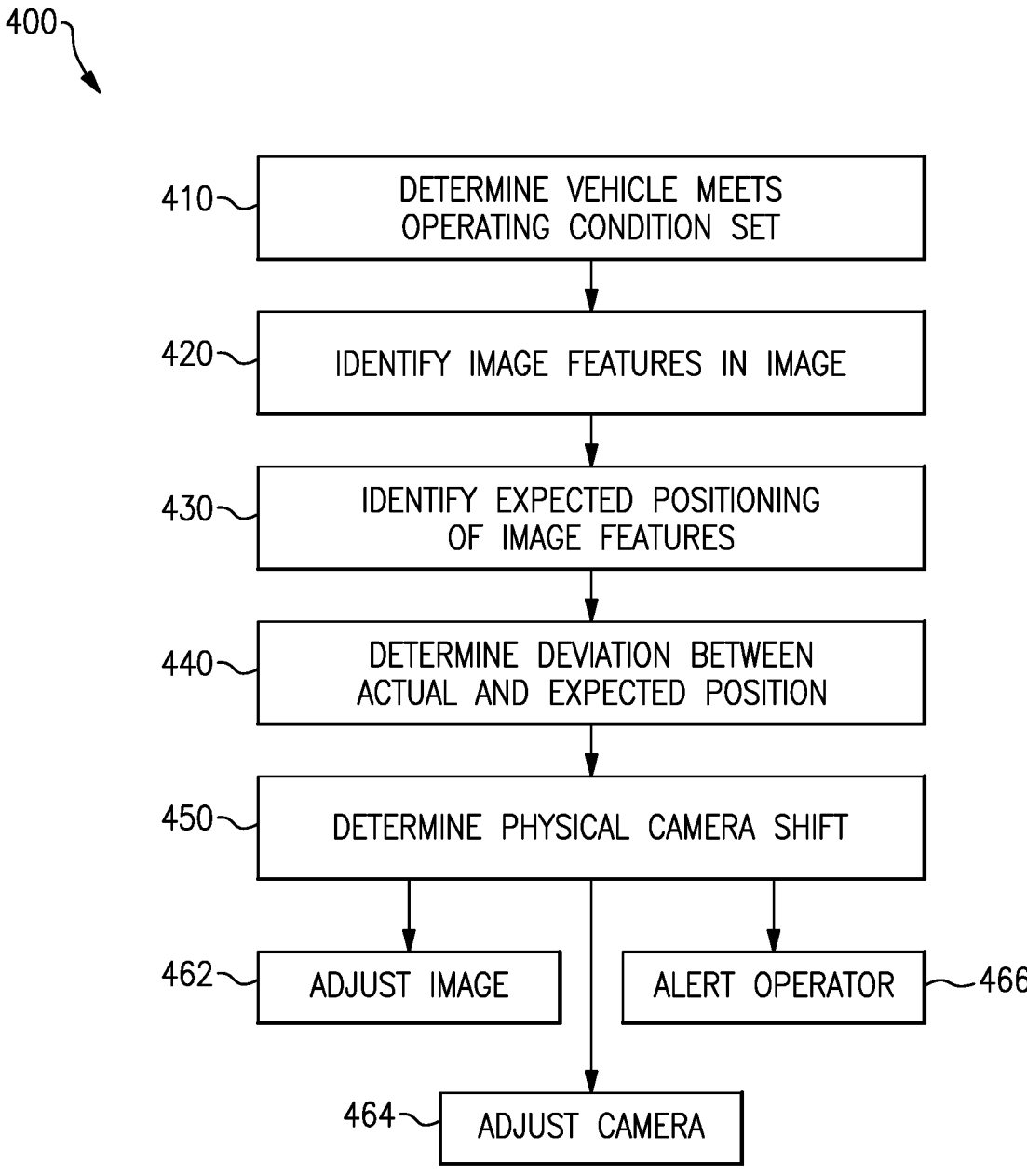
FIG. 5 schematically illustrates a process for automatically calibrating a camera angle of the camera in the wing arm of FIG. 3.

With continued reference to FIGS. 1A and 1B, FIG. 3 schematically illustrates an exemplary camera arm 16a, 16b. Each of the camera arms 16a, 16b includes a base 102 that is secured to, for example, the cab 12 (illustrated in FIG. 1A and partially illustrated in FIG. 3). A pivoting arm 104 is supported by the base 102 and may articulate relative thereto via a joint 106. In the simplified example of FIG. 3, the pivoting arm 104 is a straight arm and the joint 106 is a ball joint capable of pivoting up and down, as well as into and out of the plane of illustration. At least one rearward facing camera 20a, 20b is arranged respectively within camera arms 16a, 16b and connected to the pivot arm 104 via rotating joint (hidden in the illustration of FIG. 3). As with the ball joint 106, the hidden joint connecting the camera 20a, 20b to the pivot arm is capable of rotating about the axis of the camera, and pivoting about the pivoting arm 104 into and out of the plane of the illustration. It is appreciated that the pivoting arm 104, the ball joint 106, and the hidden joint connecting the camera 20a, 20b to the pivoting arm 104 are simplified for explanatory purposes, and that more complicated support structures including articulation arms, powered articulating joints, and similar implements can be utilized to achieve the positioning of the camera 20a, 20b described herein.

In alternative embodiments, the camera can be a rearward facing camera fixed to the cab side. In such an example, the cameras are installed in the wing housing at an offset of the cab body in the lateral direction. This allows the camera to capture the trailer as well as the environment around the trailer.

The exterior cameras 20a, 20b respectively provide an exterior field of view $FOV_{EX1}$, $FOV_{EX2}$ that each include at least one of the Class II and Class IV views (FIG. 1B), which are legal prescribed views in the commercial trucking industry. Class II and Class IV views are defined in European R46 legislation, for example, and the United States and other countries have similar drive visibility requirements for commercial trucks. Any reference to a "Class" view is not intended to be limiting, but is intended as exemplary for the type of view provided to a display by a particular camera. Multiple cameras also may be used in each camera arm 16a, 16b to provide these views, if desired. Each arm 16a, 16b may also provide a housing that encloses electronics that are configured to provide various features of the CMS 15.

First and second video displays 18a, 18b are arranged on each of the driver and passenger sides within the vehicle cab 12 on or near the A-pillars 19a, 19b to display Class II and Class IV views on its respective side of the vehicle 10, which provide rear facing side views along the vehicle 10 that are captured by the exterior cameras 20a, 20b.

If video of Class V and Class VI views are also desired, a camera housing 16c and camera 20c may be arranged at or near the front of the vehicle 10 to provide those views (FIG. 1B). A third display 18c arranged within the cab 12 near the top center of the windshield can be used to display the Class V and Class VI views, which are toward the front of the vehicle 10, to the driver.

If desired, camera housings can be disposed at the sides and rear of the vehicle 10 to provide fields of view including some or all of the Class VIII zones of the vehicle 10 (e.g., views immediately surrounding the trailer, and in the rear proximity of the vehicle including the rear of the trailer). In one example, a view of the rear proximity of the vehicle is generated by a rear facing camera disposed at the rear of the vehicle, and can include both the immediate rear proximity and a traditional rear view (e.g. a view extending rearward to the horizon, as may be generated by a rear view mirror in vehicles without a trailer). In such examples, the third display 18c can include one or more frames displaying the Class VIII views. Alternatively, additional displays can be added near the first, second and third displays 18a, 18b, 18c and provide a display dedicated to providing a Class VIII view.

Certain operations of the camera monitoring system rely on accurate knowledge of the orientation and position of the camera 20a, 20b relative to the cab 12 of the vehicle 10. Inaccurate understanding of the orientation and/or position can result in incorrect views being presented to the operator and/or incomplete views being presented to the operator. By way of example, if the CMS controller understands the cameras 20a, 20b to be oriented in a first orientation, but the cameras 20a, 20b are actually oriented in a different orientation, a class II view, which is a subset of the class IV view, presented to the vehicle operator may include too much or not enough of the trailer 14. Further, in some examples, images from the CMS cameras 20a, 20b can be used alone or in conjunction with other sensors to identify nearby objects, ground truth, and other features utilized in driver assistance systems, driver warning systems and the like. In such examples, accurate knowledge of the position and orientation of the camera increases the accuracy and reliability of the systems relying on the information.

When the vehicle 10 is in a new condition, with minimal wear, the joints 106 and pivot arm 104 are in a calibrated position from the factory calibration, and a CMS controller can accurately know the orientation of the camera(s) 20a, 20b relative to the cab 12. Operation of the vehicle 10 causes vibrations and other ordinary wear and tear. The wear and tear loosens and shifts the fasteners in the camera arms 16a, 16b, as well as the pivoting arm 104. This can, in turn, cause the camera 20a, 20b position and orientation relative to the cab 12 to shift.

Existing systems manually recalibrate the cameras according to a set recalibration schedule. Manual recalibration includes parking the vehicle in a stationary position and placing one or more physical markers in set positions on or near the vehicle within the field of view of the camera. As the physical markers are positioned in known positions, and the vehicle is stationary, the CMS understands where the markers should be within the image for the currently understood orientation. The positions of the markers within the image is then used to determine the actual orientation of the cameras 16a, 16b relative to the cab 12. If the actual orientation is off from the specification defined orientation by more than a set amount, manual adjustment of the camera orientation is ordered.

Manual calibrations such as those above are subject to human error including delaying calibration longer than scheduled, incorrectly placing the markers, and similar error causes. Furthermore, the manual calibrations do not account for unexpected events that may increase the rate at which the orientation or position of the mirror shifts. The CMS in the vehicle 10 replaces or supplements the manual calibration described above with an automatic calibration that uses an expected position of camera extrinsic elements during operation of the vehicle to verify or determine the orientation of the cameras 16a, 16b relative to the cab 12. As used herein, camera extrinsic elements refer to objects and features whose position in real world space is independent of the camera position. By way of example, a trailer 14, trailer end, trailer wheels, lane lines, curbs, road features and the like are camera extrinsic elements.

Certain image features (e.g. camera extrinsic elements within the image) of the image captured by the camera have a known, or expected, position relative to the camera while the vehicle is operating within certain parameters. By way of example, when the vehicle 10 is operating at a speed above a threshold and with a steering angle of less than 5 degrees, the operating parameters will ensure that the trailer is maintained in a steady position relative to the cab 12, and thus relative to the cameras 16a, 16b. In another example, while the vehicle is operating on a flat road with a steering angle less than 5 degrees, a vanishing point of the lane lines adjacent the trailer will be in an expected position. As used herein, the vanishing point is the point of intersection of the lane lines that are parallel to the vehicle travel direction, and merge into a single point at the horizon. In alternative examples, alternative sets of operating conditions that result in a known positioning of one or more image features can be utilized in addition to or instead of the described operating conditions.

Once the set of operating conditions is met (e.g. the vehicle is traveling above the threshold speed, has a steering angle of less than 5 degrees, and is traveling on a level road), or one of the sets of operating conditions is met in an example having multiple sets of operating conditions, the CMS controller automatically initiates the camera calibration. With continued reference to FIGS. 1A-3, FIG. 4 illustrates an exemplary view provided by the CMS of FIG. 3, including an actual view and an expected position of multiple elements. Included in the field of view 300 illustrated in FIG. 4 is the trailer 12, multiple wheels 302, a trailer end corner 304, a rear edge 304, an edge 308 of the trailer 12, and a lane line vanishing point 307. In addition, a vanishing point 310 of the lane lines 311 is extrapolated beyond the field of view 300.

In one example, the camera may have experienced an orientation shift causing the camera to angle upwards relative to the cab 12 and a ground plane 301. This shift causes the actual position of the image features 302, 304, 306, 307, 308, 310 in the image to be lower than expected. The CMS Controller stores the set of expected positions 302', 304', 306', 307', 308', 310' in an internal memory or is capable of retrieving the expected positions 302', 304', 306', 307', 308', 310' from an external memory. The CMS controller compares the actual position of the image features 302, 304, 306, 307, 308 to the expected positions 302', 304', 306', 307' 308'. Based on the determined shift, the CMS controller determines the magnitude by which the orientation the camera has shifted and/or the magnitude of the distance by which the camera has shifted.

When the actual orientation and/or distance deviates from the factory calibration by a small enough magnitude, no physical orientation or position change is necessary and the CMS controller can adjust the position of the displayed field of view in software (e.g., shifting a class II view within the larger class IV view). Alternatively, when the orientation deviates from the factory calibration by an amount that is too large to compensate for in software, the CMS controller can output a warning or alert informing the vehicle operator that the CMS requires physical adjustment to the camera orientation.

With continued reference to FIGS. 1A-4, FIG. 5 schematically illustrates a process 400 for performing the automatic calibration. During operation of the vehicle 10, the CMS controller is in communication with the vehicle systems through a CAN bus, or similar communication system, and analyzes the vehicle operating conditions in a "Determine Vehicle Meets Operating Condition Set" step 410. When the vehicle operating conditions meet one of the predetermined sets of operating condition (e.g. the speed over a threshold, steering angle under a threshold and level road conditions described above), the process 400 determines that the vehicle is operating within one of the defined sets and initiates the calibration process.

Once in the calibration process, the CMS controller analyzes an image provided by the camera(s) 20a, 20b and identifies at least one image features corresponding to the operating condition set that the vehicle is operating in, in an "Identify Camera Extrinsic Elements in Image" step 420. When the CMS controller includes more than one predefined operating condition set, each set can have unique, overlapping, or identical image features depending on the particular set of conditions and the particular vehicle. While the process described herein can be completed, and the camera(s) calibrated, with only a single image feature, it is appreciated that additional image features can provide redundancy and verification to the calibration, thereby improving the calibration process 400.

After identifying the actual position of each corresponding image feature in the image, the CMS controller identifies an expected position of each image feature within the image in an "Identify Expected Positioning of Image features" Step 430. The expected positions are then compared to the actual positions and a difference between the positions is identified in a "Determine Deviation Between Actual and Expected Position" step 440. The deviation is the magnitude and direction by which the actual position is offset from the expected position.

The magnitude and direction of the deviation is correlated on a one to one basis with a physical orientation and/or position shift of the camera according to an empirically determinable relationship. This empirically determinable relationship is used by the CMS controller to determine the physical shift of the camera in a "Determine Physical Camera Shift" step 450. When the calibration determines that the camera angle has shifted, depending on the magnitude of the physical shift, the CMS controller can branch to one of three actions.

When the orientation change is below a predefined threshold (e.g. when the orientation shift is such that the class II view is still fully encompassed by the class IV view), the CMS controller compensates for the orientation shift using software to adjust the positioning of the Class II view in an "Adjust Image" step 462.

When the orientation shift is above the predefined threshold, and when the camera arms 16a, 16b include powered orientation controls, the CMS controller can communicate directly with the actuators controlling the camera arms 16a, 16b, or communicate with them through a CAN bus or similar communication system, and reposition the camera to their original orientation, or to an orientation where the class II view is entirely within the class IV view (step 464).

When the orientation shift is above the predefined threshold, and where the camera arms 16a, 16b are not powered, the CMS controller can output an alert to the operator indicating that the corresponding mirror replacement camera needs to be repositioned (step 466). In some examples, where the camera orientation and/or position shift is severe enough, this alert can further be used to toggle off vehicle systems that rely on images from the mirror replacement cameras and may have inaccurate or sub-optimal operations due to the misaligned camera.

In order to ensure that the process is operated frequently enough to maintain calibration of the cameras, while not expending valuable processing power in the CMS controller, the process 400 is run the first time a set of operating conditions is met during each engine on/off cycle, and during future times where a set of operating conditions are met within the same engine on/off cycle the process is not run.

In some optional implementations, the system can include an ability for the vehicle operator to trigger the calibration process 400 or to flag the system to re-calibrate even if a set of operating conditions has already been met during the current engine on/off cycle. In yet other implementations, the process 400 can be run every other engine on/off cycle, every fifth engine on/off cycle, every tenth engine on/off cycle, or any other interval depending on the conditions that the vehicle 10 is operated in.

Although an example embodiment has been disclosed, a worker of ordinary skill in this art would recognize that certain modifications would come within the scope of the claims. For that reason, the following claims should be studied to determine their true scope and content.

What is claimed is:

1. A camera monitoring system comprising:
a first mirror replacement camera extending outward from a vehicle, the first mirror replacement camera defining a rearward facing field of view, wherein the rearward facing field of view includes at least one image feature during at least a first set of operating conditions, and wherein the at least one image feature has a fixed location within the field of view during the at least the first set of operating conditions, wherein the at least one image feature includes lane lines; and
a camera monitoring system controller configured to automatically calibrate an orientation of the first mirror replacement camera relative to the vehicle by comparing an expected location of a first vanishing point of the lane lines to an actual location of a second vanishing point of the lane lines while the vehicle is operating under the first set of operating conditions and identifying a shift of camera orientation based on a difference in the first and second vanishing points, wherein the camera monitoring system controller is further configured to respond to the shift of camera orientation by adjusting a positioning of a displayed view when the shift is below a predefined magnitude.

2. The camera monitoring system of claim 1, wherein the first mirror replacement camera is disposed on a commercial vehicle cab, and the at least one image feature includes at least one feature of a trailer connected to the cab.

3. The camera monitoring system of claim 2, wherein the at least one image features includes at least one element from a set including at least a trailer wheel, a trailer end corner, a trailer rear edge, and a trailer top edge.

4. The Camera monitoring system of claim 3, wherein the at least one image feature includes at least two elements from the set.

5. The camera monitoring system of claim 1, wherein the first set of operating conditions includes a speed of the vehicle being above a first threshold and a steering angle of the vehicle being below a second threshold.

6. The camera monitoring system of claim 5, wherein the first set of operating conditions includes a road grade below a third threshold.

7. The camera monitoring system of claim 1, wherein the at least a first set of operating conditions includes a second set of operating conditions.

8. The camera monitoring system of claim 1, wherein adjusting the positioning of the displayed view when the shift is below the predefined magnitude includes adjusting a positioning of a class II view within a class IV view.

9. The camera monitoring system of claim 1, wherein a support structure for the mirror replacement camera includes at least one powered articulating element, the powered articulating element being controlled by the camera monitoring system controller, and wherein the camera monitoring system controller is configured to respond to the shift of camera orientation by articulating the powered articulating element such that the shift of camera orientation is reduced relative to a factory calibrated camera orientation.

10. The camera monitoring system of claim 1, wherein the camera monitoring system controller is configured to output at an alert to a vehicle operator when the shift or camera orientation exceeds a threshold magnitude.

11. A method for automatically calibrating an orientation of a vehicle camera comprising:

a camera monitoring system (CMS) controller receiving at least one image from a vehicle mounted camera that includes lane lines;

comparing an expected location of a first vanishing point of the lane lines to an actual location of a second vanishing point of the lane lines while the vehicle is operating under at least a first set of operating conditions;

identifying a shift of camera orientation based on a difference in the first and second vanishing points; and automatically providing an output based upon the difference, wherein the output includes adjusting a positioning of a displayed view when the shift is below a predefined magnitude.

12. The method of claim 11, wherein the vehicle mounted camera is disposed on a vehicle cab, and the at least one image feature includes at least one feature of a trailer connected to the vehicle cab.

13. The method of claim 12, wherein the at least one image feature includes at least one element from a set including at least a trailer wheel, a trailer end corner, a trailer rear edge, and a trailer top edge.

14. The method of claim 13, wherein the at least one image feature includes at least two elements from the set.

15. The method of claim 11, wherein the first set of operating conditions includes a speed of the vehicle being above a first threshold and a steering angle of the vehicle being below a second threshold.

16. The method of claim 15, wherein the first set of operating conditions includes a road grade below a third threshold.

17. The method of claim 11, wherein the at least the first set of operating conditions includes a second set of operating conditions.

18. The method of claim 11, wherein adjusting the positioning of the displayed view when the shift is below a predefined magnitude includes adjusting a positioning of a class II view within a class IV view.

19. The method of claim 11, wherein the output includes articulating a powered articulating element such that the shift of camera orientation is reduced relative to a factory calibrated camera orientation.

20. The method of claim 11, wherein the output includes providing an alert to a vehicle operator when the shift or camera orientation exceeds a threshold magnitude.

* * * * *